United States Patent [19]

Gulley et al.

[11] Patent Number: 4,827,659

[45] Date of Patent: May 9, 1989

[54] TROTLINE DEVICE

[76] Inventors: Travis Gulley, Rt. 2, Box 129B, #16, Kilgore, Tex. 75662; Oscar L. Nelson, Rt. 8, Box 446 A, Longview, Tex. 75604; James R. Nelson, 17 Meridian St., R.R. 3, Gladewater, Tex. 75647

[21] Appl. No.: 222,425

[22] Filed: Jul. 21, 1988

[51] Int. Cl.$^4$ .................... A01K 97/00; A63D 71/00; A65D 85/00

[52] U.S. Cl. ................... 43/57.3; 206/315.11; 224/920

[58] Field of Search ................... 43/57.3, 27.4; 206/315.11, 372, 374, 375, 565; 224/920

[56] References Cited

U.S. PATENT DOCUMENTS

| | | |
|---|---|---|
| 1,371,148 | 3/1921 | Dice . |
| 1,542,927 | 6/1925 | Whitaker ........................ 206/372 |
| 2,599,113 | 6/1952 | Latta et al. ...................... 43/54.5 |
| 2,670,565 | 3/1954 | Platt ................................ 43/57.3 |
| 2,680,929 | 6/1954 | Work ............................... 43/57.5 |
| 3,005,281 | 10/1961 | Reitzammer ................... 43/54.5 |
| 3,466,785 | 9/1969 | Shook ............................. 43/57.3 |
| 3,486,267 | 12/1969 | Hitre .............................. 43/54.5 |
| 3,842,530 | 10/1974 | Jackson et al. ................ 43/57.3 |
| 4,525,949 | 7/1985 | Pike et al. ...................... 43/57.3 |

Primary Examiner—Gene P. Crosby
Assistant Examiner—William Scott Andes
Attorney, Agent, or Firm—Fleit, Jacobson, Cohn & Price

[57] ABSTRACT

A trotline storage and dispensing device is disclosed. The device includes a base wall, first and second pairs of side walls extending upwardly from the base wall, and a divider wall extending substantially parallel to each of the first pair of side walls and between each wall of the second pair of side walls. A pair of storage compartments, each bounded by the base wall, one of the first pair of side walls, the divider wall and the second pair of side walls is thus formed. Hook storage and dispensing tubes are disposed at the top of and extend along each of the first pair of side walls. Each of the storage compartments receives a trotline, while the hook storage and dispensing tubes receive and retain hooks connected by leaders to the trotline so that as the storage and dispensing device is moved away from an anchored end of each trotline, the trotline, leaders and hooks are pulled over one of the second pair of side walls and out of the storage and dispensing device.

9 Claims, 2 Drawing Sheets

TROTLINE DEVICE

BACKGROUND OF THE INVENTION

This invention relates to a device used for fishing and, more particularly, to a device for storing and dispensing a trotline.

1 Field of the Invention

The use of a trotline for fishing is well known. Typically, the trotline is character.ized by a strong, relatively heavy line onto which a series of hooks are secured by leaders. The hooks are baited and then laid out into the water in order to attract fish.

2. Description of Related Art

U.S. Pat. No. 2,670,565 to Platt discloses a trotline receiver and dispenser from which a known trotline is dispensed for use. The trotline receiver and dispenser disclosed by this patent includes a box with an upright affixed to its rear wall. A rod is secured at one end to the upright and extends longitudinally of the box so as to support and guide a plurality of hooks connected to stagings or leaders, which are, in turn, connected to the trotline. In order to feed the trotline out from the trotline receiver and dispenser, one end of the trotline is anchored, and the box is set in a boat. As the boat is moved away from the anchored end of the trotline, hooks attached to the trotline are paid out of the box by being guided along and passed over a curved end of the rod.

The trotline receiver and dispenser of this patent is designed to receive and dispense only a single trotline at any given time. Additionally, the construction of the upright and rod secured to the upright is relatively complicated and necessitates the use of an additional restraining arm which runs parallel to the rod.

SUMMARY OF THE INVENTION

It is therefore one object of this invention to provide a simplified trotline storage and dispensing device of unitary construction in which a plurality of trotlines can be stored and from which the trotlines can be dispensed without becoming entangled. Accordingly, a trotline storage and dispensing device is disclosed which includes a base wall, first and second pairs of side walls extending upwardly from the base wall, and a divider wall extending substantially parallel to each of the first pair of side walls and between each wall of the second pair of side walls. A pair of storage compartments, each bounded by the base wall, one of the first pair of side walls, the divider wall and the second pair of side walls is therefore formed. Hook storage and dispensing tubes are disposed at the top of and extend along each of the first pair of side walls. Each storage compartment receives a trotline, and the hook storage and dispensing tubes receive and retain hooks connected by leaders to the trotline in such a manner that as the storage and dispensing device is moved away from an anchored end of each trotline, the trotline, leaders and hooks are pulled over one of the second pair of side walls and out of the storage and dispensing device.

It is another object of this invention to provide a simplified structure from which hooks attached to the trotline are paid out and in which the hooks are stored when the trotline is not in use. Accordingly, the trotline storage and dispensing device includes tubular hook storage and dispensing means formed with an upwardly opening, longitudinally extending slot within which an end of each hook is received during storage of the trotlines.

BRIEF DESCRIPTION OF THE DRAWINGS

The manner in which the above objects are achieved will become apparent by considering the description which follows in conjunction with the drawing figures, in which.

DETAILED DESCRIPTION OF THE PREFERRED EMBODIMENT

Figure 3:
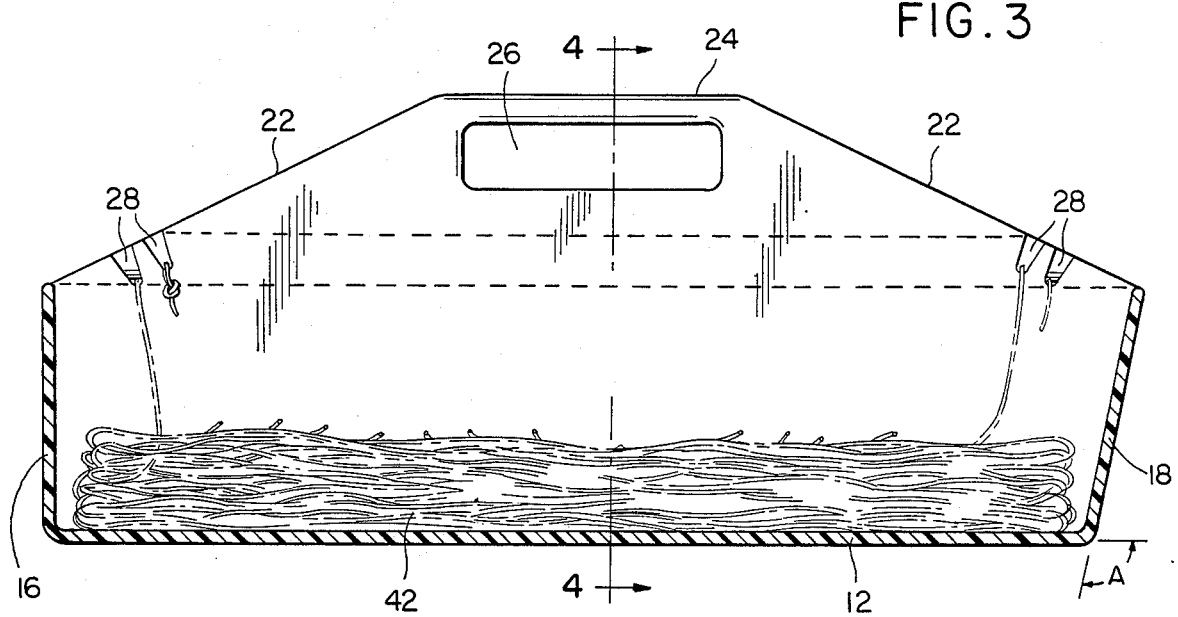
FIG. 3 is a sectional view of the device as seen along section line 3—3 of FIG. 2.
Figure 4:
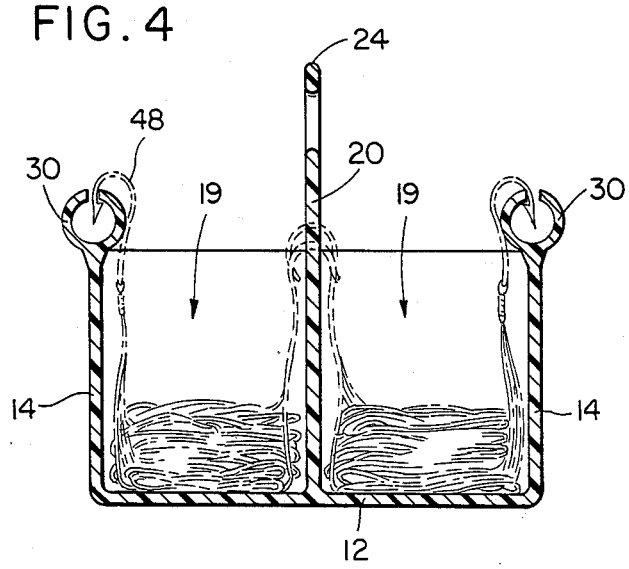
FIG. 4 is a sectional view of the device as seen along section line 4—4 of FIG. 3.

As best shown in FIGS. 3 and 4, the trotline storage and dispensing device 10 according to the invention includes a flat bottom or base wall 12, a first pair of longer side walls 14 and a second pair of first and second shorter side walls 16 and 18. First shorter side wall 16 is located at the rear of the device, while second shorter side wall 18 is located at the front of the device. Both of the longer side walls 14 and the first shorter side wall 16 are, as illustrated, oriented substantially perpendicular to base wall 12. The second shorter side wall 18 is preferably oriented at an obtuse angle A relative to base wall 12 for a purpose which will become apparent. Angle A is preferably somewhere between 90° and 135°

An upstanding central divider wall 20 extends throughout the length of device 10 between the first and second shorter walls 16 and 18 and substantially parallel to each longer side wall 14. A separate storage compartment 19 is thus formed by the divider wall 20 between the divider wall and each of the larger side walls 14. Each of the separate compartments is bounded by base wall 12, one of the longer side walls 14, divider wall 20 and shorter side walls 16 and 18. Divider wall 20 is, as illustrated, substantially perpendicular to base wall 12.

The upper portion of divider wall 20 includes upwardly angled edges 22 which converge toward one another and toward a top edge 24. An aperture 26 is incorporated in the upper portion of divider wall 20 in order to form a handle by which the device can be manually transported. A pair of grooves or notches 28 are provided in the upwardly angled edges 22 of divider wall 20 adjacent each of the shorter side walls 16 and 18. Notches 28 are for fastening and locating opposite ends of preassembled trotlines which are to be stored in and dispensed from compartments 19.

A pair of elongated hook storage and dispensing tubes 30 are located at the top of each longer side wall 14. Each tube 30 extends along substantially the entire length of its respective longer side wall 14. At least the end of each tube 30 adjacent side wall 18 is preferably bevelled as at 32. Each tube 30 is formed with a radial slot 34 in its wall. One such slot 34 opens upwardly and extends longitudinally along each tube 30 from a first end of the tube adjacent side wall 18. Each slot 34 terminates at a point 36 on its tube before reaching the second, opposite end of the tube adjacent side wall 16 so that the slot does not quite extend along the entire length of the tube.

A hole 40 is formed in the wall of each tube adjacent the first end of the tube. Each hole 40 is formed in the wall of the respective tube 30, so that its axis projects radially of the tube 30.

The trotline storage and dispensing device 10 described is preferably, but not necessarily, molded in one piece in a known manner from plastic material, such as polystyrene or polyethylene. Such plastic material is lightweight and not easily susceptible to wear. Wood or metal can alternatively be used to construct the device.

Device 10 is to be used with conventional trotlines 42. Each trotline 42 includes a series of leaders 44 fastened at one end to the trotline by knots 46, for example. Hooks 48 include eyes 49 by which the hooks are fastened to the other end of each leader 44 in a known manner.

Figure 1:
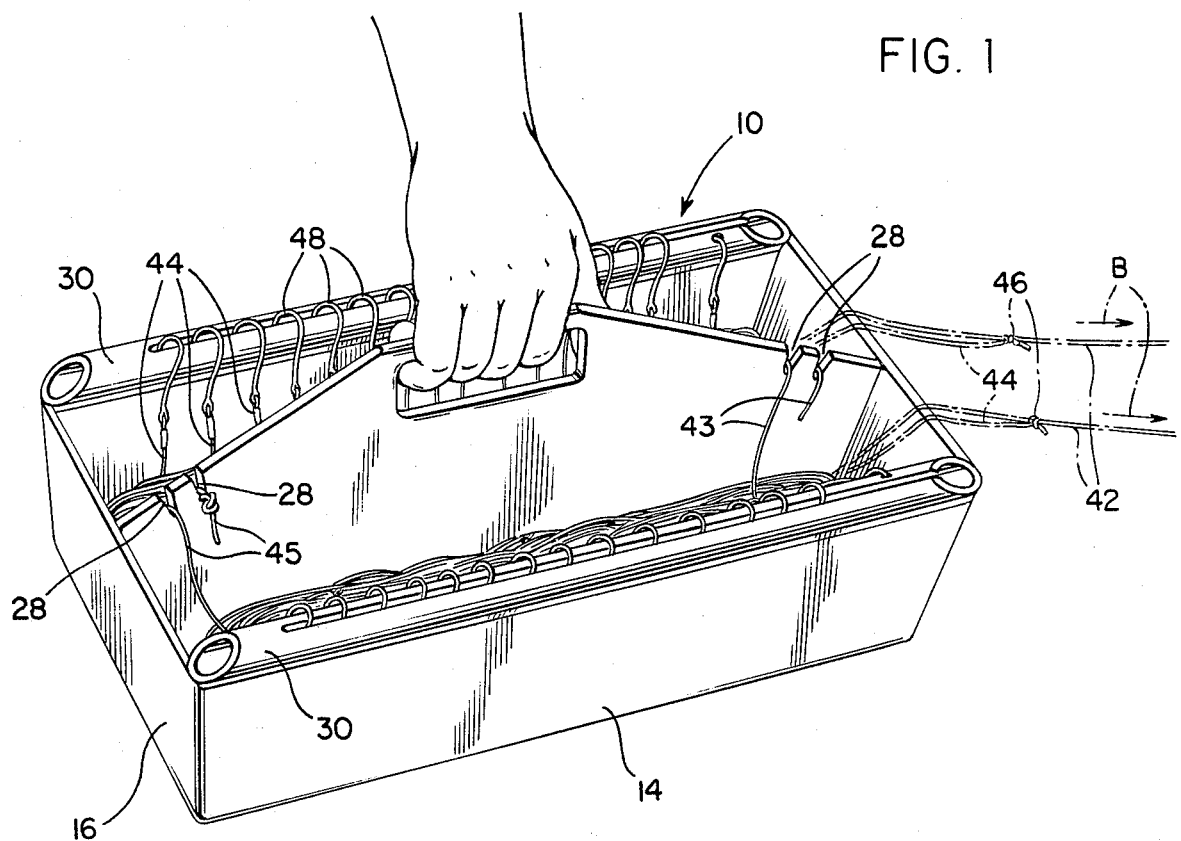
- FIG. 1 is a perspective view of the trotline storage and dispensing device according to the invention.
Figure 2:
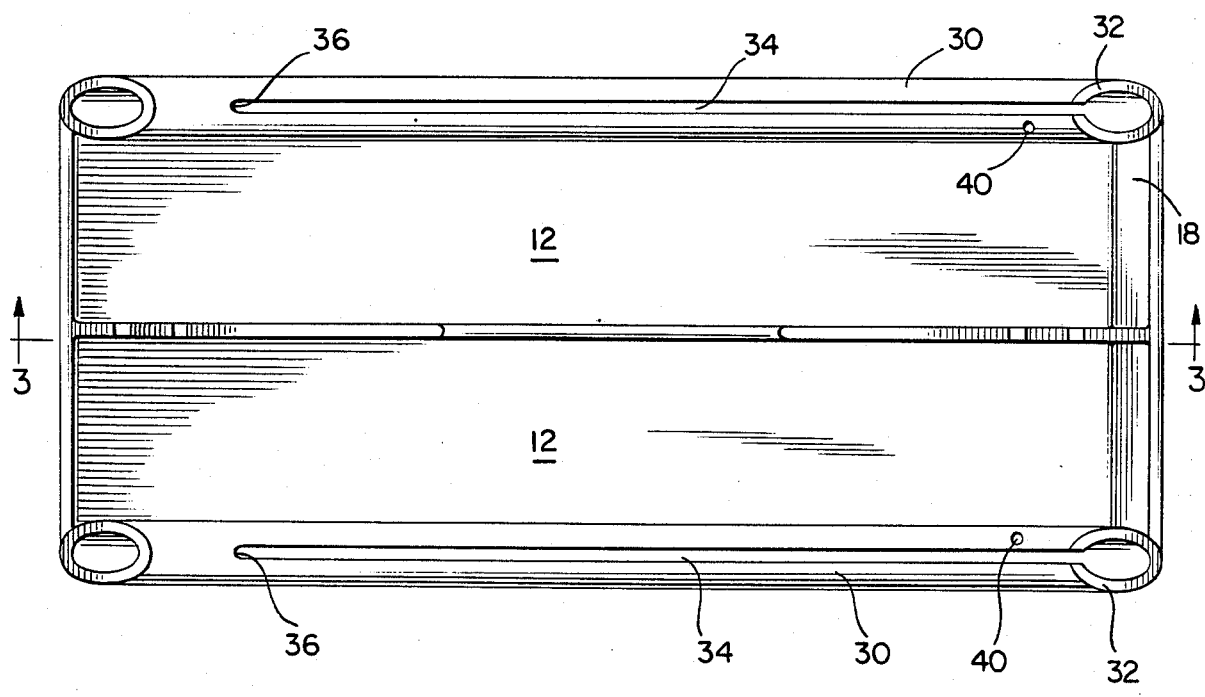
FIG. 2 is a top view of the device.
Figure 5:
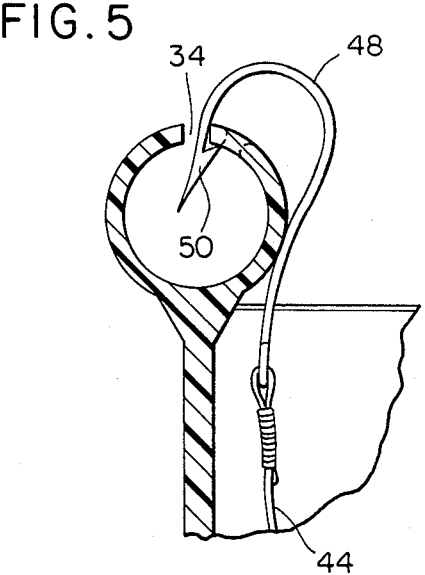
FIG. 5 is an enlarged sectional view of the hook storage and dispensing means of the invention.
Figure 6:
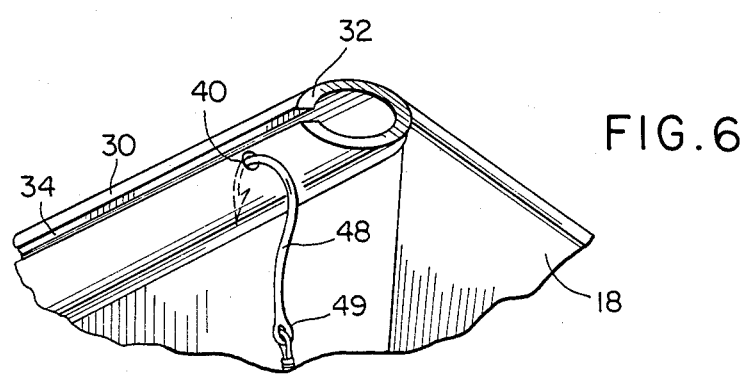
FIG. 6 is a perspective view of an end portion of the hook storage and dispensing means.

Trotlines 42 are stored in compartments 19 when not in use. Due to the presence of central divider wall 20, a trotline may be stored in and dispensed from each compartment 19 without becoming entangled. Front end 43 of each trotline 42 is received in a notch 28 as shown in solid lines in FIG. 1. As should be clear from FIG. 1, when the trotlines 42 are stored in compartments 19, the end of each hook 48 is received within one of the slots 34. Each leader 44 extends downwardly along sidewalls 14 from the eye 49 of a hook 48 to the point at which it is fastened to trotline 42. As can be seen in FIG. 5, the barb 50 of each hook 48 can be used to help retain hook 48 within slot 34 by abutting with the radially inner surface of the tube.

The last hook 48 fastened to trotline 42 is placed in hole 40. By placing the last hook 48 in hole 40, the last hook is prevented from moving longitudinally relative to tube 30 when the storage and dispensing device 10 is subjected to sudden movement or vibration. In this manner, hole and the last hook 48 cooperate to act as a hook stop at the first end of tube 30, which secures the remaining hooks 48 within slot 34 and prevents spillage of the hooks 48 from the slot.

In order to dispense the trotline and its associated hooks and leaders from the device 10, front end 43 of the trotline stored in each compartment 19 is removed from a notch 28 adjacent the angled, shorter side wall 18. Since ends 43 are located in notches 28 before the trotline is to be dispensed, ends 43 of the trotline are easily found and picked up by a user so that the ends may be attached to a stationary anchor or weight (not shown) when trotline 42 is to be dispensed. These ends 43 are each attached in a known manner to the stationary anchor or weight. The user then grasps the handle formed by aperture 26 and moves device 10 away from the attached ends 43. Since ends 43 are attached to the stationary anchor or weight, the trotlines, leaders and hooks are pulled over side wall 18 and out of storage and dispensing device 10. Referring again to FIG. 1, the trotlines, leaders and hooks are pulled from device 10 as shown in phantom in the direction of arrow B. Since the second shorter side wall 18 at the front of storage and dispensing device 10 is oriented at obtuse angle A relative to base wall 12, the trotline leaders and hooks are dispensed without snagging on wall 18. The trotlines are pulled from storage compartments 19 and the hooks from hook storage and dispensing tubes 30 until the trotline, leaders and hooks are completely dispensed from device 10. Ends 45 of trotline 42 may be knotted and anchored or otherwise fastened within notches 28 adjacent rear side wall 16 so that the trotline is not completely pulled out of the storage and dispensing device.

It should be clear to those skilled in the art that hooks 48 are preferably baited individually as they are pulled from tubes or after complete dispensing most idealistically.

In order to retrieve and once again store the trotline, leaders and hooks in device 10, end 43 of the trotline is again positioned in notches 28 adjacent wall 18. Hooks 48 on each trotline are sequentially slid by the user into slot 34 in the respective tube 30. Trotline 42 and leaders 44 simultaneously drop into the respective storage compartment 19. Because the end of each tube 30 adjacent side wall 18 is bevelled as at 32, the insertion of hooks 48 into slots 34 is easily observable, and the user is also less likely to scrape his or her fingers against the end of the tubes. The last hook 48 to be slid into each slot 34 is placed into hole 40 as previously described so that the remaining hooks are secured within the slot.

The foregoing is considered as illustrative only of the principles of the invention. Since numerous modifications and changes may occur to those skilled in the art, it is not desired to limit the invention to the exact construction and operation shown and described. Accordingly, there are various modifications and equivalents that fall within the scope of the invention.

We claim:

1. A trotline storage and dispensing device comprising:

a base wall, first and second pairs of side walls extending upwardly from said base wall to form at least one storage compartment bounded by said base wall and said side walls, hook storage and dispensing means disposed at the top of and extending along each of said first pair of side walls, each of said storage compartments receiving a trotline, the hook storage and dispensing means receiving and retaining hooks connected by leaders to the trotline so that as the storage and dispensing device is moved away from an anchored end of each trotline, the trotline, leaders and hooks are pulled over one of said second pair of side walls and out of the storage and dispensing device.

2. A trotline storage and dispensing device comprising:

a base wall, first and second pairs of side walls extending upwardly from said base wall, a divider wall extending substantially parallel to each of the first pair of side walls and between each wall of the second pair of side walls to form a pair of storage compartments, each bounded by said base wall, one of said first pair of side walls, said divider wall and said second pair of side walls, hook storage and dispensing means disposed at the top of and extending along each of said first pair of side walls, each of said storage compartments receiving a trotline, the hook storage and dispensing means receiving and retaining hooks connected by leaders to the trotline so that as the storage and dispensing device is moved away from an anchored end of each trotline, the trotline, leaders and hooks are pulled over one of said second pair of side walls and out of the storage and dispensing device.

3. A trotline storage and dispensing device as defined by claim 2, wherein said divider wall includes an aperture incorporated in an upper portion thereof which forms a handle by which the device can be manually transported.

4. A trotline storage and dispensing device as defined by claim 3, wherein said divider wall is provided with at least one notch adjacent each of the second pair of side walls to receive opposite ends of each trotline during storage of the trotlines.

5. A trotline storage and dispensing device as defined by claim 4, wherein said second pair of side walls includes a front wall and a rear wall, wherein the trotlines, leaders and hooks are pulled over said front wall, and wherein rear ends of each trotline are anchored in the at least one notch adjacent said rear wall so that the trotline is not completely pulled out of the device as it is moved away from the anchored end of the trotline.

6. A trotline storage and dispensing device as defined by claim 5, wherein said front wall is oriented at an obtuse angle relative to said base wall so that each trotline, the leaders and the hooks are pulled over said front wall without snagging.

7. A trotline storage and dispensing device as defined by claim 2, wherein each of said hook storage and dispensing means comprises a tube formed with an upwardly opening, longitudinally extending slot within which an end of each hook is received during storage of the trotlines.

8. A trotline storage and dispensing device as defined by claim 7, wherein an end of each tube adjacent the one of said second pair of side walls is bevelled.

9. A trotline storage and dispensing device as defined by claim 8, wherein a hole is formed in the wall of each tube in which the end of the last hook fastened to the trotline can be placed so that the last hook and the hole cooperate to act as a stop to secure the remaining hooks on the trotline within said slot.

* * * * *